United States Patent
Lee et al.

(10) Patent No.: US 8,234,032 B2
(45) Date of Patent: Jul. 31, 2012

(54) METHOD AND APPARATUS FOR GENERATING SAFE PATH OF MOBILE ROBOT

(75) Inventors: Jae-Yeong Lee, Daejeon (KR); Wonpil Yu, Daejeon (KR); Yun Koo Chung, Daejeon (KR)

(73) Assignees: Electronics and Telecommunications Research Institute, Daejeon (KR); SK Telecom Co., Ltd., Seoul (KR)

( * ) Notice: Subject to any disclaimer, the term of this patent is extended or adjusted under 35 U.S.C. 154(b) by 472 days.

(21) Appl. No.: 12/482,708

(22) Filed: Jun. 11, 2009

(65) Prior Publication Data

US 2010/0121517 A1 May 13, 2010

(30) Foreign Application Priority Data

Nov. 10, 2008 (KR) .................. 10-2008-0110860
Apr. 8, 2009 (KR) .................. 10-2009-0030325

(51) Int. Cl.
*G01C 22/00* (2006.01)
(52) U.S. Cl. .......................... 701/25; 700/245
(58) Field of Classification Search .......... 700/245; 701/25, 26, 210
See application file for complete search history.

(56) References Cited

U.S. PATENT DOCUMENTS

| | | | | |
|---|---|---|---|---|
| 5,363,305 A | * | 11/1994 | Cox et al. .................. | 701/200 |
| 5,502,638 A | | 3/1996 | Takenaka | |
| 5,548,511 A | | 8/1996 | Bancroft | |
| 2007/0027579 A1 | * | 2/2007 | Suzuki et al. .............. | 700/245 |
| 2007/0058838 A1 | * | 3/2007 | Taniguchi .................. | 382/103 |
| 2007/0276541 A1 | * | 11/2007 | Sawasaki .................. | 700/253 |
| 2009/0055020 A1 | * | 2/2009 | Jeong et al. ............... | 700/251 |
| 2009/0234527 A1 | * | 9/2009 | Ichinose et al. ............ | 701/23 |
| 2009/0292393 A1 | * | 11/2009 | Casey et al. ............... | 700/245 |
| 2010/0198443 A1 | * | 8/2010 | Yabushita et al. .......... | 701/25 |
| 2011/0010083 A1 | * | 1/2011 | Lee et al. .................. | 701/200 |

FOREIGN PATENT DOCUMENTS

| | | |
|---|---|---|
| EP | 0 556 031 | 8/1993 |
| JP | 2007-249632 | 9/2007 |
| KR | 10-2005-0024840 | 3/2005 |

* cited by examiner

*Primary Examiner* — Thomas G. Black
*Assistant Examiner* — Shardul Patel
(74) *Attorney, Agent, or Firm* — Staas & Halsey LLP

(57) ABSTRACT

A method for generating a safe path of a mobile robot includes searching for a whole path from a starting point to a destination point within a map information entered in the robot; extracting information about an expected distance between the robot and a peripheral obstacle when the robot moves along the searched whole path; and correcting the whole path locally using the information about the expected distance from the peripheral obstacle.

18 Claims, 3 Drawing Sheets

METHOD AND APPARATUS FOR GENERATING SAFE PATH OF MOBILE ROBOT

CROSS-REFERENCE(S) TO RELATED APPLICATION(S)

The present invention claims priority of Korean Patent Applications No. 10-2008-0110860, filed on Nov. 10, 2008, and No. 10-2009-0030325, filed on Apr. 8, 2009, which are incorporated herein by reference.

FIELD OF THE INVENTION

The present invention relates to a traveling technique with regard to generation of a path of a mobile robot, and, in particular, to a method and apparatus for generating a safe path of the mobile robot that is suited to dynamically generate a safe path minimizing the probability of collision during a travel based on a whole path to a destination point on a given map.

BACKGROUND OF THE INVENTION

Search for a path or avoidance of an obstacle is the most essential technique in autonomous travel of a mobile robot. A mobile robot travels along the path generated up to the destination point and must arrive at the destination point without colliding any peripheral obstacle. Hereinafter, a good path means the shortest path that minimizes the traveling path to the destination point or a safe path that minimizes the probability of collision with peripheral obstacles. In general, a safe path is of greater importance than a good path in robot applications; however, the most ideal path would be one that is the safest as well as the shortest as possible.

In order to ensure a safe path, in general, it has been customary to determine the travel direction of a robot by taking into consideration both the direction in which free space is most available and the direction toward the destination point, the former being searched by using obstacle detection sensors equipped on a robot (such as laser and ultrasound devices that can measure a distance to peripheral obstacles). Weights of the direction towards the free space and of the direction towards the destination point are determined by experiments. While it is possible to decrease the possibility of collision with obstacles by increasing the weight on the free space, this would give rise to a situation in which the robot should take a long detour or, in an extreme case, cannot arrive at the destination point. On the other hand, an increased weight on the destination point would result in less safety in the path. As such, the travel performance of a robot is greatly influenced by the weights.

Because the optimal weights depend on the spatial configurations of the obstacles or circumstances in which the robot is operated, one has to adjust the weights experimentally in order to cope with these factors. A well-known extreme example is given by a situation the destination point is located on the other side of a U-shaped obstacle; quite often than not, the robot is not able to go through to the destination point, once it gets in the obstacle.

The safety of a travel path of a robot hinges primarily on the amount of the safe distance from peripheral obstacles that exist along the travel path. In existing methods, the safety of a travel path is estimated by weights between the safest direction (in which the free space is permitted the most) and the destination point direction and, therefore, it is extremely difficult to determine intuitively the safe distance to the obstacle under consideration. For example, if the two weights are identical and the destination point direction lies exactly opposite to the safest direction, then the robot would move sideways in a direction perpendicular to both of them. When the destination point lies at the end of a passage that narrows down, the safest direction would lie in the direction away from the destination point, and hence the robot could, as normally desired, arrive at the destination point, should a greater weight be given to the destination point direction. Because effects of the weights on determination of the travel path are not intuitive, under general circumstances a great number of experiments should be carried out to find the optimal weights. It should be also noted that the optimal weights may not be found at all in some extreme cases.

SUMMARY OF THE INVENTION

In view of the above, the present invention provides a method and apparatus generating a safe path of a mobile robot that ensures a safe distance to peripheral obstacles while maintaining the shortest path.

Further, the present invention provides a method and apparatus generating a safe path of a mobile robot that can search for a whole path on a map from the present position of the robot to the destination point and revise dynamically the searched whole path using information about the obstacles around the robot.

In accordance with one aspect of the present invention, there is provided a method for generating a safe path of a mobile robot, including:

searching for a whole path from a starting point to a destination point within a map information entered in the robot;

extracting information about an expected distance between the robot and a peripheral obstacle when the robot moves along the searched whole path; and correcting the whole path locally using the information about the expected distance from the peripheral obstacle.

In accordance with another aspect of the present invention, there is provided an apparatus for generating a safe path of a mobile robot, including:

a whole path search module which searches for a whole path from a starting point to a destination point within a map information entered in the robot;

an obstacle-information extraction unit which extracts information about an expected distance between the robot and a peripheral obstacle when the robot moves along the searched whole path; and a path correction module which corrects the whole path locally using the information about the expected distance from the peripheral obstacle.

BRIEF DESCRIPTION OF THE DRAWINGS

The above features of the present invention will become apparent from the following description of embodiments, given in conjunction with the accompanying drawings, in which.

DETAILED DESCRIPTION OF THE EMBODIMENTS

Hereinafter, embodiments of the present invention will be described in detail with reference to the accompanying drawings.

Figure 1:
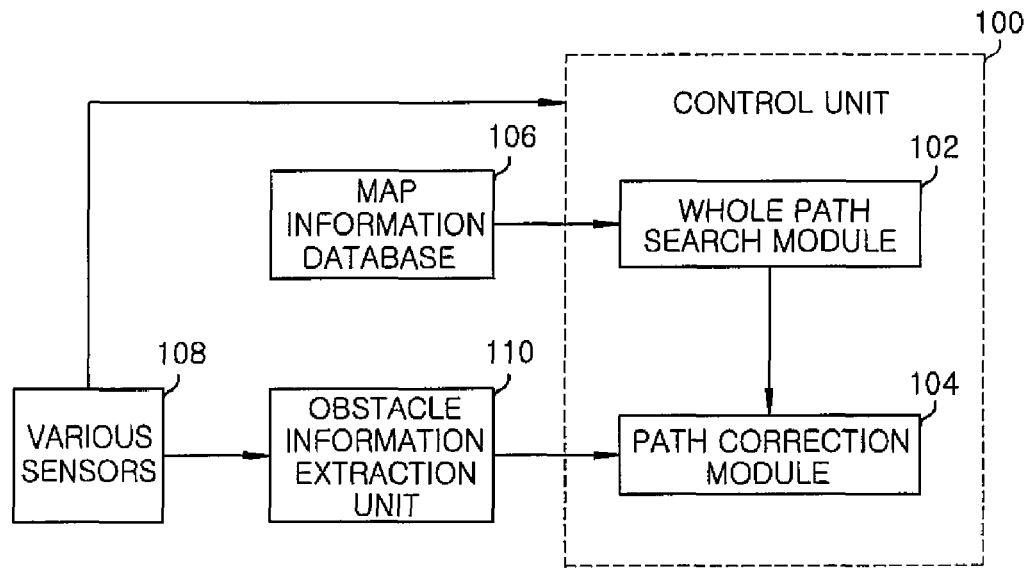
FIG. 1 shows a block diagram of the structure of an apparatus for generating a safe path in accordance with an embodiment of the present invention.

FIG. 1 depicts a block diagram of a structure of an apparatus for generating a safe path of a mobile robot in accordance with an embodiment of the present invention. In FIG. 1, it can be seen that the apparatus comprises a control unit 100, a map information database 106, various sensors 108 and an obstacle information extraction unit and the control unit 100, in turn, includes a whole path search module 102 and a path correction module 104.

More specifically speaking, the control unit 100 controls a robot on a particular domain to generate a path from a starting point to a destination point and searches for a path that gets around an obstacle in order to move the robot in a way safe and fast. In the whole path search module 102, map information on a particular domain is passed from the map information database 106 and the present location of the robot is received from a position measuring sensor (e.g. Global Positioning System or GPS) among the various sensors 108. Based on these data, a whole path from a starting point, i.e. the present location, to a destination point is determined.

To search for a whole path, the A* algorithm or Dijkstra's algorithm may be employed. In particular, when the A* algorithm is employed, in particular, the shortest path from a starting point to a destination point can always be obtained without failure. It should be mentioned, however, that embodiments of the present invention are not limited to those algorithms mentioned in the above but can be applied to any high-speed algorithms if they can search for a whole path in the whole path search module 102.

In the path correction module 104, the whole path searched previously is corrected dynamically by using obstacle information around a robot. The obstacle information is first obtained by an obstacle detection sensor 108 that uses laser or ultrasound to measure a distance to a peripheral obstacle and then passed to the obstacle information extraction unit 110. Here, comparison is made between the map information about a particular domain that is passed from the map information database 106 and the obstacle information to extract accurate obstacle information on a particular domain and the extracted obstacle information is passed to the path correction module 104.

The obstacle information distinguishes a region that the robot can travel from a region that it cannot and such information is calculated based on the original map information and information obtained by using real-time obstacle detection sensors. Although the obstacle information can be extracted undoubtedly by using either of the map information or the real-time obstacle detection sensors, it is recommended to use the two means at the same time in order to attain more accurate obstacle information.

In the path correction module 104, the whole path that was searched previously in the whole path detection module 102 is subject to correction, if necessary. First, the marginal spaces at the present position of the robot on the whole path are defined as those two segments whose end points are located within a pre-determined distance in the directions perpendicular to the whole path. And then the correction is made such that the midpoint of the marginal spaces becomes the new path.

Figure 3:
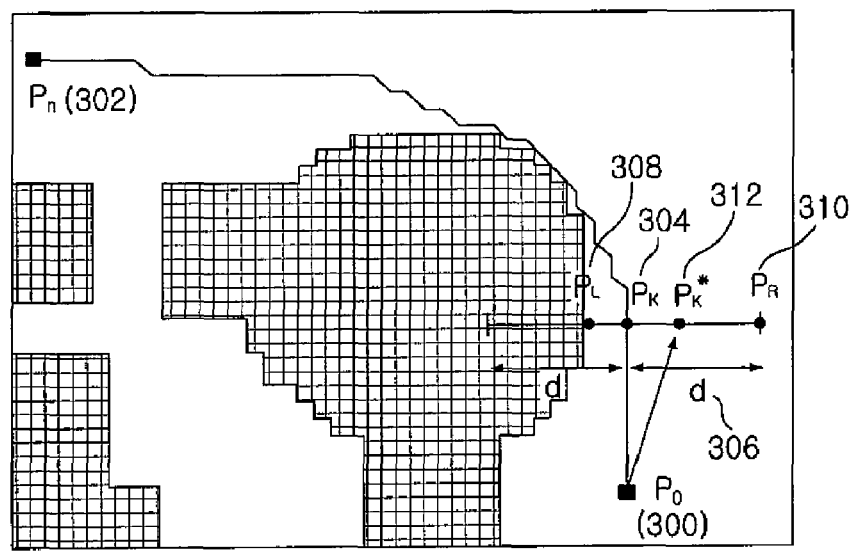
FIG. 3 shows a traveling path of a robot in accordance with an embodiment of the present invention.

FIG. 3 shows a traveling path of a robot in accordance with an embodiment of the present invention. In FIG. 3, the present location of the robot is denoted by $P_0$ 300 and the destination point by $P_n$ 302. A whole path from the present location $P_0$ to the destination point $P_n$ is divided into n subintervals and the corresponding nodes are denoted by $P_0, P_1, P_2, \ldots, P_n$, respectively. In order for the robot to travel along a searched whole path, it has to adjust its speed and direction by taking a specific point on the path for the interim destination. This point shall be called the control point and is denoted by $P_k$ 304. Note that the control point $P_k$ 304 is not fixed on the path but changes its position in general as the robot travels.

Because it is highly likely that the robot wanders off in a haphazard way if the nearest point $P_1$ (not shown in the figure) from $P_0$ 300 is taken for the control point, it is desirable to take a point which is a sufficient distance ahead on the path. It is evident in general that the farther the control point $P_k$ 304 we take, the smoother the motion control becomes. If we take the control point too far away, however, the robot may collide with the obstacle when it turns around a sharp corner of the obstacle. Therefore, an appropriate value for $P_k$ 304 should be employed for a reasonable result, for which we suggest that a distance about 80 cm ahead of the robot is used. The positions at which the respective segments of distance d 306 perpendicular to the whole path at the control point $P_k$ 304 intersect the nearest obstacle are denoted by $P_L$ 308 and $P_R$ 310, respectively. If a segment does not intersect an obstacle within a distance d, then the endpoint of that segment is taken for the corresponding obstacle point, as shown by $P_R$ in FIG. 3.

The position of the midpoint $P^*_k$ is given by $$P^*_k(x, y) = \left(\frac{x_L + x_R}{2}, \frac{y_L + y_R}{2}\right), \tag{1}$$

where $(x_L, y_L)$ and $(x_R, y_R)$ are the coordinates of the obstacle points, $P_L$ 308 and $P_R$ 310, respectively. Hence, the corrected path of the robot is generated such that it passes through the midpoint $P^*_k$ toward which the robot travels.

Although the robot is supposed to pass through the control point $P_k$ in order to follow the searched whole path, this shortest path does not guarantee a safe path and hence the path information is corrected such that the robot passes through the midpoint $P^*_k$ 312 of the marginal space at the control point $P_k$ 304.

The path information corrected as such is transmitted to the travelling unit (not shown in the figure) where, based on this information, the speed and direction of driving devices (e.g., servomotors) are controlled to move the robot to travel along the corrected path.

Such a path correction method allows a robot to follow the whole path in general and travel maintaining a safe distance from an obstacle as well.

Figure 4:
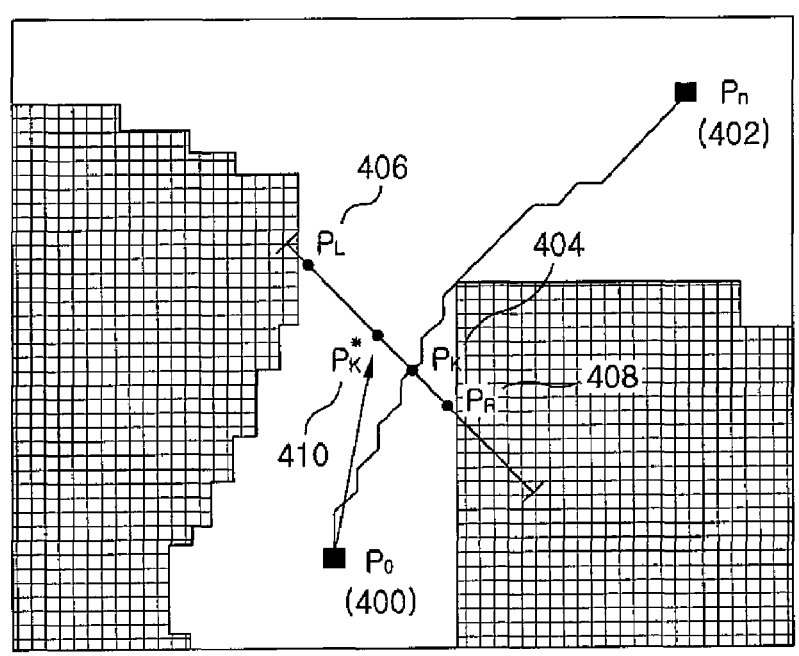
FIG. 4 shows a traveling path of a robot in a presence of an obstacle in accordance with an embodiment of the present invention.

FIG. 4 shows a case in which the robot travels through a narrow passage between obstacles such that both of them exist within the segments of length d in the directions perpendicular to the path. In FIG. 4, the present location of the robot, the location of the destination and the control point are denoted by $P_0$ 400, $P_n$ 402 and $P_k$ 404, respectively, and the obstacle points at which the two segments of length d intersect with the obstacles at the closest distance are noted by $P_L$ 406 and $P_R$ 408, respectively.

The midpoint $P^*_k$ 410 between the two obstacle points, $P_L$ 406 and $P_R$ 408, is taken for a new control point in a similar way as shown in FIG. 3, and the robot moves towards this point. In other words, the robot passes through the middle of the hollow space within the obstacle in this case.

Figure 2:
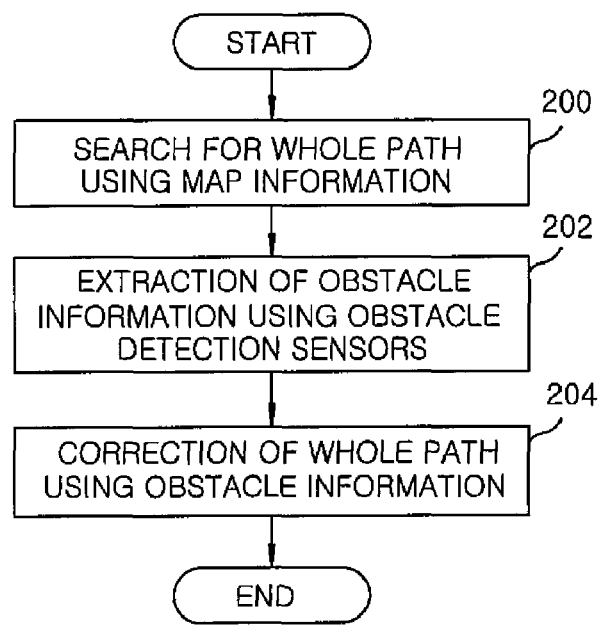
FIG. 2 shows the operation process of an apparatus for generating a safe path in accordance with an embodiment of the present invention.

FIG. 2 shows a flowchart of a dynamic process of an apparatus for generating a safe path of a mobile robot in accordance with an embodiment of the present invention.

In step 200, the whole path search module 102 searches a whole path from the starting point to the destination point based on the map information about a specific domain passed from the map information database 106. If the information about the present location of the robot measured from the various sensors 108 is received, the whole path from the present location of the robot to the destination is searched based on the map information and measured information.

In step 202, the obstacle information extraction unit 110 extracts the information about the location of obstacles based on the obstacle information transferred from obstacle detection sensors contained in the various sensors 108. If the map information is received from the map information database 106, more accurate obstacle information can be extracted by a comparison with the obstacle information.

In the path correction module 104, the whole path information transferred from the whole path search module 102 in step 204 is locally corrected by using the obstacle information transferred from the obstacle information extraction unit 110.

Correction of the whole path information is carried out as follows: first, two segments of a predetermined length (for example, d 306) perpendicular to the whole path are computed at a point on the whole path that is a certain distance ahead of the robot; and if an obstacle exists within the predetermined distance, the distance to the obstacle is computed and the new midpoint between the predetermined distance(s) and/or the marginal space to the obstacle(s), whichever is shorter, is taken for the new corrected path.

The value of the distance d 306 can be adjusted intuitively depending on how wide the safe distance to the obstacle is appropriate. That is, if the distance d 306 is set to be zero, the robot would travel along the whole path and if it is increased, a wider safe distance to the obstacle would be maintained.

Figure 5:
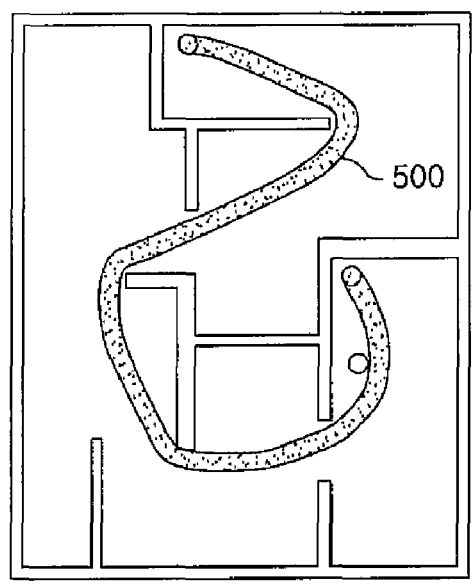
FIGS. 5 and 6 show an effect of a distance parameter d on a traveling path of a robot in accordance with an embodiment of the present invention.
Figure 6:
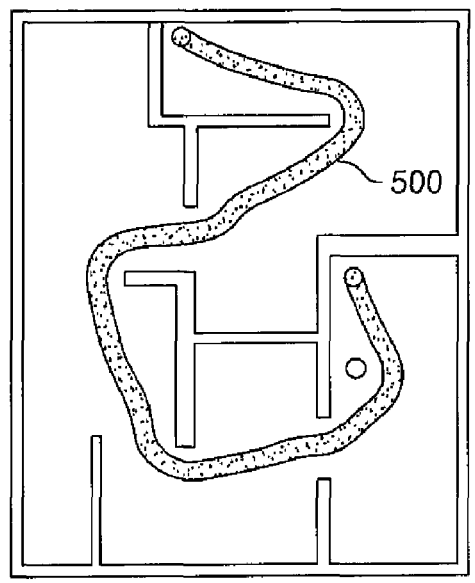

FIGS. 5 and 6 show an effect of a distance parameter d 306 on a traveling path of a robot in accordance with an embodiment of the present invention. Referring to FIG. 5, when the distance d 306 is set to be small, d=2, the robot travels along the shortest path 500 from the starting point to the destination point with the obstacle in a relatively close proximity. In this case, a reliable safe distance is not maintained despite the robot can travel along the shortest path. Referring to FIG. 6, when the value of the distance d 306 is increased, d=10, the robot travels along the path 502 with a safe distance farther to the obstacle than in the case 500 shown in FIG. 5.

In the case the state of the path (i.e. pavement) is irregular or a swift travel is needed, the value of the distance d 306 can be increased to maintain the safe distance to the obstacle. It can be set manually by the user or to account for the change in the speed of the robot, it can be calculated in the control unit 100 in association with the travelling unit.

For example, when the travelling speed is increased in order to reduce the time period needed to arrive at the destination, the distance parameter d 306 is adjusted to be proportional to the increased travelling speed. That is, if the speed of the robot gets increased, the distance parameter d would be of a larger value to maintain a reliable safe path; however, if the speed of the robot gets decreased, the distance parameter d would be of a smaller value. The ratio of proportionality can be set depending on the individual setting methods as speed of the robot: distance d=1:1 or x:1 or 1:y.

While the invention has been shown and described with respect to the preferred embodiments, it will be understood by those skilled in the art that various changes and modifications may be made without departing from the spirit and scope of the invention as defined in the following claims.

What is claimed is:

1. A method for generating a safe path of a mobile robot, comprising:
searching for a whole path from a starting point to a destination point within a map information entered in said robot;
extracting information about an expected distance between said robot and a peripheral obstacle when said robot moves along said searched whole path; and
correcting said whole path locally using said information about the expected distance from the peripheral obstacle,
wherein said correcting:
defines as a control point a point on the whole path that is located at a specified distance ahead of the present location of said robot;
calculates a marginal space within a pre-determined value in both directions perpendicular to said whole path at said control point; and
defines a new path that passes through a midpoint of said calculated marginal space.

2. The method for generating a safe path of a mobile robot according to claim 1, wherein said information about the expected distance from the peripheral obstacle is extracted based on data measured by obstacle detection sensors.

3. The method for generating a safe path of a mobile robot according to claim 2, wherein said information about the expected distance from the peripheral obstacle is extracted based on comparison of said data measured by obstacle detection sensors and said map information.

4. The method for generating a safe path of a mobile robot according to claim 1, wherein said correcting calculates said midpoint of the calculated marginal space based on said location of a detected obstacle, if an obstacle is detected within a pre-determined distance in both directions perpendicular to said whole path at said control point.

5. The method for generating a safe path of a mobile robot according to claim 4, wherein said correcting
defines as obstacle points respective locations at the nearest distances where the segments that are perpendicular to said whole path at said control point and have same lengths as said pre-determined distances respectively in both directions meet said peripheral obstacle; and
defines said midpoint of the segment between said obstacle points as a midpoint of said marginal space.

6. The method for generating a safe path of a mobile robot according to claim 5, wherein endpoints of said segment are defined as obstacle points, if there is no peripheral obstacle within a segment of a length of pre-determined distance.

7. The method for generating a safe path of a mobile robot according to claim 4, wherein said pre-determined distance is defined to be proportional to a moving velocity of said robot.

8. The method for generating a safe path of a mobile robot according to claim 1, wherein said search of whole path uses the A* algorithm or Dijkstra's search algorithm.

9. The method for generating a safe path of a mobile robot according to claim 1, wherein said starting point of the robot is decided based on information about the present location of the robot measured by a Global Positioning System (GPS).

10. An apparatus for generating a safe path of a mobile robot, comprising:
- a whole path search module which searches for a whole path from a starting point to a destination point within a map information entered in said robot;
- an obstacle-information extraction unit which extracts information about an expected distance between said robot and a peripheral obstacle when said robot moves along said searched whole path; and
- a path correction module which corrects said whole path locally using said information about the expected distance from the peripheral obstacle,
- wherein said path correction module
- defines as a control point a point on the whole path that is located at a specified distance ahead of the present location of said robot;
- calculates a marginal space within a pre-determined value in both directions perpendicular to said whole path at said control point; and
- defines a new path that passes through a midpoint of said calculated marginal space.

11. The apparatus for generating a safe path of a mobile robot according to claim 10, wherein said obstacle-information extraction unit extracts information about an expected distance from said obstacle based on data measured by obstacle detection sensors.

12. The apparatus for generating a safe path of a mobile robot according to claim 11, wherein said obstacle-information extraction unit extracts said information about the expected distance from the peripheral obstacle based on comparison of said data measured by obstacle detection sensors and said map information.

13. The apparatus for generating a safe path of a mobile robot according to claim 10, wherein said path correction module calculates said midpoint of the calculated marginal space based on said location of a detected obstacle, if an obstacle is detected within a pre-determined distance in both directions perpendicular to said whole path at said control point.

14. The apparatus for generating a safe path of a mobile robot according to claim 13, wherein said path correction module
- defines as obstacle points respective locations at the nearest distances where the segments that are perpendicular to said whole path at said control point and have same lengths as said pre-determined distances respectively in both directions meet said peripheral obstacle; and
- defines said midpoint of the segment between said obstacle points as a midpoint of said marginal space.

15. The apparatus for generating a safe path of a mobile robot according to claim 14, wherein said path correction module defines endpoints of said segment as obstacle points, if there is no peripheral obstacle within a segment of a length of pre-determined distance.

16. The apparatus for generating a safe path of a mobile robot according to claim 13, wherein said pre-determined distance defined to be proportional to a moving velocity of said robot.

17. The apparatus for generating a safe path of a mobile robot according to claim 10, wherein said whole-path detection module uses the A* algorithm or Dijkstra's search algorithm.

18. The apparatus for generating a safe path of a mobile robot according to claim 10, wherein said whole-path detection module decides said starting point based on said information about the present location of the robot measured by a Global Positioning System (GPS).

* * * * *